J. BLACK & A. H., H. & A. B. LENNOX.
CONTINUOUS DRYING MACHINE.
APPLICATION FILED DEC. 29, 1908.

921,351.

Patented May 11, 1909.
3 SHEETS—SHEET 1.

J. BLACK & A. H., H. & A. B. LENNOX.
CONTINUOUS DRYING MACHINE.
APPLICATION FILED DEC. 29, 1908.
921,351.
Patented May 11, 1909.
3 SHEETS—SHEET 2.
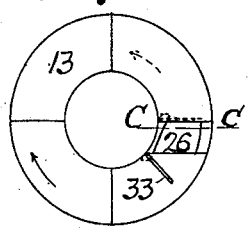
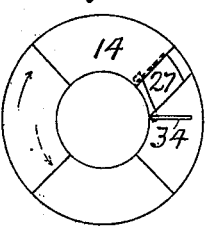
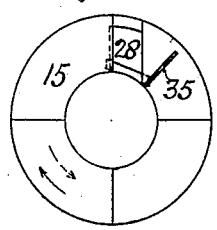
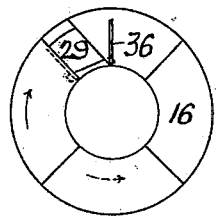
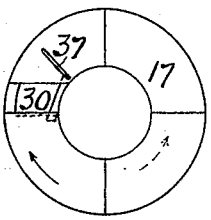
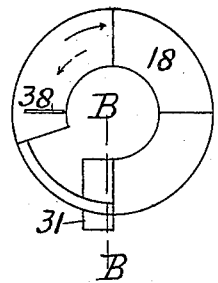
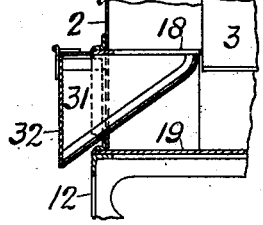
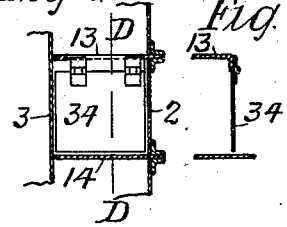
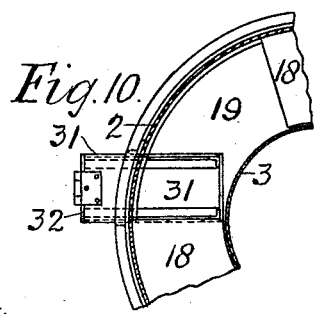
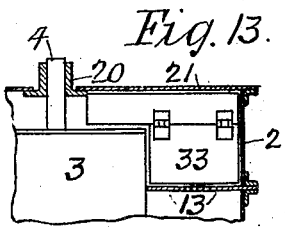

J. BLACK & A. H., H. & A. B. LENNOX.
CONTINUOUS DRYING MACHINE.
APPLICATION FILED DEC. 29, 1908.

921,351.

Patented May 11, 1909.
3 SHEETS—SHEET 3.

Witnesses
A. J. Hathaway
A. J. Hidden

Inventors
James Black
Allison Hall Lennox
Harold Lennox
Allison Bell Lennox
by their Attorney R. Haddan

UNITED STATES PATENT OFFICE.

JAMES BLACK, ALLISON HALL LENNOX, HAROLD LENNOX, AND ALLISON BELL LENNOX, OF NEWCASTLE-UPON-TYNE, ENGLAND.

CONTINUOUS-DRYING MACHINE.

No. 921,351.  Specification of Letters Patent.  Patented May 11, 1909.

Application filed December 29, 1908. Serial No. 469,865.

*To all whom it may concern:*

Be it known that we, JAMES BLACK, ALLISON HALL LENNOX, HAROLD LENNOX, and ALLISON BELL LENNOX, subjects of the King of England, residing at Newcastle-upon-Tyne, Northumberland, in England, have invented certain new and useful Improvements in Continuous-Drying Machines, of which the following is a specification.

This invention relates to improvements in continuous drying machines for drying grain, peat, hops, salt, sand, cement, manures, chemicals, small coal, ores, and other analogous wet or moist materials.

The machine consists of a fixed circular metallic casing of suitable diameter and capacity for the quantity of material to be dried in a given time, and of a revolving inner vertical cylinder concentric with the fixed casing and connected to a central shaft which is driven in any suitable manner.

A preferred embodiment of the improved machine is represented in the annexed drawings in which—

Figure 1:
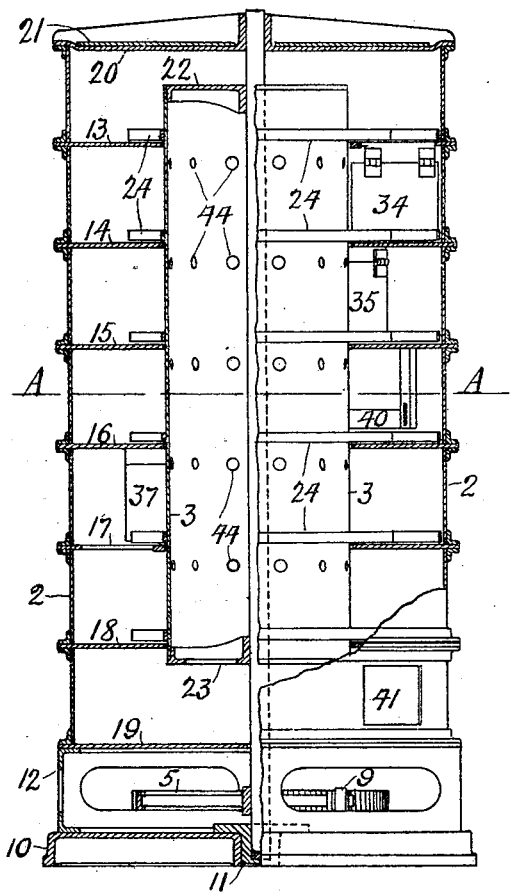
Figure 2:
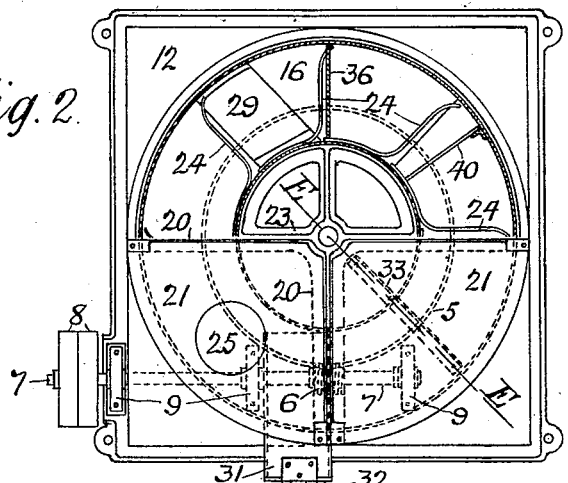
Figure 14:
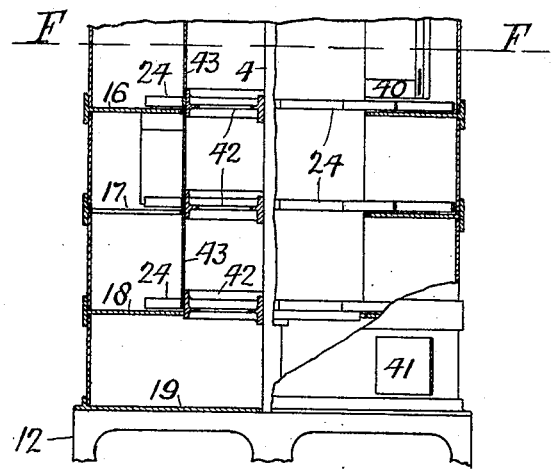
Figure 15:
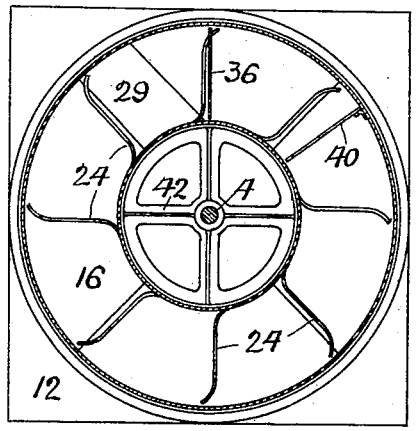

Figure 1 is a sectional elevation thereof; Fig. 2 a plan view partly in section on the line A—A of Fig. 1; Figs. 3 to 8 are diagrammatic plan views of the shelves showing the openings therein and deflecting partitions adjacent said openings; Fig. 9 is a section on the line B—B of Fig. 8 showing the discharge spout; Fig. 10 is a plan view of Fig. 9; Fig. 11 is a section on the line C—C of Fig. 3; Fig. 12 is a section on the line D—D of Fig. 11; Fig. 13 is a section on the line E—E of Fig. 2; Fig. 14 is a partial vertical section showing an alternative method of constructing the shelves, and attaching same to the casing; also an alternative method of attaching the scrapers to rings fixed on the central shaft and completing the inner cylinder by metallic sheeting and Fig. 15 is a section on the line F—F of Fig. 14.

The fixed metallic casing 2 is composed of a series of cylinders with top and bottom flanges and contains within same the revolving cylinder 3 fixed to the central shaft 4, the lower end of which carries a worm-wheel 5 in mesh with a worm 6 mounted on the driving shaft 7 provided with fast and loose pulleys 8. The shaft 7 is carried in bearings 9 on the bed plate 10 which also carries the bearings or foot-step 11 for the lower end of the shaft 4. The casing 2 is supported by the framing 12 mounted on said bed plate 10. The shelves 13, 14, 15, 16, 17 and 18 are fixed between the flanges of the cylinders forming the casing and are made of any convenient number of parts, those shown in in the drawings (Figs. 3 to 8) being of four parts. 19 designates the bottom plate of the casing 2 and 20 the top frame thereof which also forms the upper bearing for the central shaft 4, and above which are placed the cover plates 21. The inner cylinder 3 is provided with ends 22 and 23 at top and bottom respectively, these ends being fixed to and revolving with the shaft 4 and in the drawings being shown as closed above and open below. In Figs. 1 and 2 the cylinder 3 is shown as carrying the scrapers 24 fixed thereto said scrapers being slightly curved at their inner and outer ends.

One of the cover plates 21 is provided with an aperture 25 for reception of the material to be dried which passes on to the topmost shelf and in the course of its treatment passes through the holes 26, 27, 28, 29 and 30 in the shelves 13, 14, 15, 16, and 17 respectively to the lowermost shelf 18 from which it is discharged through the spout or chute 31 into any suitable receptacle, said spout being provided with a hinged door 32. Adjacent each of the holes in the shelves are the hinged deflecting partitions 33, 34, 35, 36, 37 or 38 before referred to, hanging from a cover plate 21 and from the shelves 13, 14, 15, 16 and 17 respectively, suitable provision being provided on said cover plate and shelves for attaching same. 40 indicates the spreaders adjustably fixed to the casing 2 in the positions previously described.

The heat supply such as hot air or gases may enter at the point 41 shown at the side of the casing 2.

In the modification shown in Figs. 14 and 15 rings 42 carrying the scrapers 24 are shown as attached to the central shaft 4 the intermediate spaces being filled with metallic sheeting 43 to form the inner cylinder 3, and the shelves fit between the unflanged ends of the casing cylinders and are flanged outside said casing.

In Figs. 3 to 8 the arrows in solid lines show the direction of travel of the material and those in broken lines that of the hot air or gases.

A series of open holes 44 in the inner cylinder 3 may be provided through which hot air or gases which pass up inside said cylinder may escape to the spaces between the shelves.

We do not limit ourselves to the exact construction and arrangement of parts hereinbefore described since the same may be varied within the scope of the following claims without departing from the spirit of the invention.

What we claim as our invention and desire to secure by Letters Patent of the United States is:—

1. A continuous drying machine comprising an outer casing, fixed shelves dividing said casing into a series of superposed compartments and each provided with a differently positioned aperture, a revoluble central cylinder within the casing, scrapers rotating in conjunction with said cylinder whereby the material is discharged from one shelf to the next below through the apertures therein after having made a substantially complete circuit of each shelf, means for the supply of a heating medium to the lower part of said casing, and deflecting plates extending substantially from shelf to shelf adjacent the discharge aperture therein for deflecting the drying medium through each of said compartments in a direction contrary to the movement of the scrapers.

2. A continuous drying machine comprising an outer casing constructed of a series of superposed cylinders, shelves, fixed between adjacent pairs of said cylinders, dividing said casing into a series of superposed compartments and each provided with a differently positioned aperture, a revoluble central cylinder within the casing, scrapers rotating in conjunction with said cylinder whereby the material is discharged from one shelf to the next below through the apertures therein after having made a substantially complete circuit of each shelf, means for the supply of a heating medium to the lower part of said casing, and deflecting plates extending substantially from shelf to shelf adjacent the discharge aperture therein for deflecting the drying medium through each of said compartments in a direction contrary to the movement of the scrapers.

3. A continuous drying machine comprising an outer casing, a cover plate for said casing, fixed shelves dividing said casing into a series of superposed compartments and each provided with a differently positioned aperture, a revoluble central cylinder within the casing, scrapers rotating in conjunction with said cylinder whereby the material is discharged from one shelf to the next below through the apertures therein after having made a substantially complete circuit of each shelf, means for the supply of a heating medium to the lower part of said casing and deflecting plates hinged to the cover plate aforesaid and to the lower surfaces of the respective shelves, said plates extending substantially from shelf to shelf adjacent the discharge aperture therein for deflecting the drying medium through each of said compartments in a direction contrary to the movement of the scrapers.

In witness whereof we have signed this specification in the presence of two witnesses.

JAMES BLACK.
ALLISON HALL LENNOX.
HAROLD LENNOX.
ALLISON BELL LENNOX.

Witnesses:
NORMAN McDONALD,
CHARLES STEPHEN GARDNER.